Figure 1:
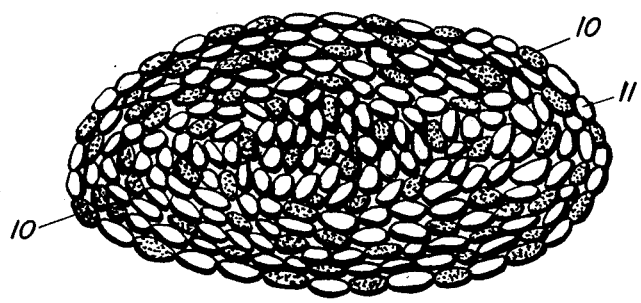

Oct. 14, 1952 A. A. SOLLERS 2,613,474

TOXIC BAIT FOR OYSTER BEDS

Filed March 7, 1950

*INVENTOR.*
ALLAN A. SOLLERS.

BY Howard J. Whelan,
ATTORNEY.

Patented Oct. 14, 1952

2,613,474

UNITED STATES PATENT OFFICE 2,613,474

TOXIC BAIT FOR OYSTER BEDS

Allan A. Sollers, Baltimore, Md.

Application March 7, 1950, Serial No. 148,170

3 Claims. (Cl. 43—132)

This invention relates to the preservation of natural shellfish life in coastal areas and more particularly to the elimination of the primary enemies of oysters and the like, as they pass through their natural existence or cultivation on the beds at the bottom of the sea or other waters suitable to them.

The cultivation of edible shellfish is faced with a serious natural menace in many localities, due to the destruction incurred by their natural enemies of the echinodermic and boring classes. In the natural state of things, starfish, borers and other echinodermic parasites prey on oysters and other similar types of shellfish in the sea waters adjacent to the various coasts of the world, and tend to keep the balance of this type of life within desirable limits. However, where oysters and the like are collected for the edible and culinary needs of man, in substantial quantities, without providing artificial facilities for the increased propagation of the shellfish, the inroads of the echinoderms by their additional or cumulative destruction, tend to reduce the shellfish to an extinction point, particularly where nothing is done to control the increase in the echinoderms. Efforts and plans have been developed and employed along the lines of destroying these parasitic elements, as for instance by distributing lime over the oyster beds in quantities of three barrels to an acre of bed, but such methods have proven too expensive in labor and material and lacking in sufficient effectiveness to be of practical value at the present time. The starfish and the oyster borer are the names of the best known parasites in this matter, met with along the coasts of the United States, and they have become a particular menace along the coasts of Maryland, Virginia, Delaware, and other States of the eastern seaboard. To overcome this menace and to increase the available supply of oysters and the like, this invention provides for a source of toxic baits that will attract these parasites and encourage them to tackle said baits as a step in the natural procedures that they follow until they are overcome or killed by the poison they absorb. By this means the predators are destroyed and their potentiality for wiping out oyster beds overcome.

For a better understanding of the invention reference is made to the accompanying drawings which illustrate the method employed to overcome the destructive effects of starfish and borers on oyster beds, by way of example, while the claims emphasize the scope of the invention.

Figure 2:
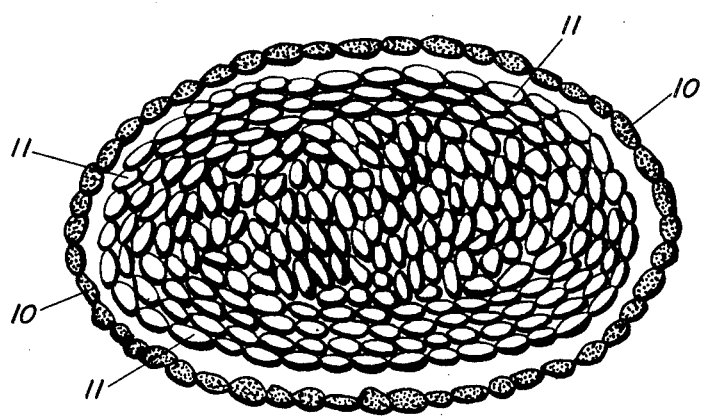

In the drawings:

Figure 1 is a plan view of the bait embodying this invention spread over an oyster bed; and Figure 2 is a plan view of an oyster bed with the bait positioned around the outer edges.

Similar reference numerals pertain to the same parts throughout the drawings.

The method employed in this form of the invention consists in the use of pieces of furnace slag 10 as they come from steel plants or blast furnaces. The sizes are preferably about the dimensions of an ordinary oyster shell and they are given a form that is roughly like that of the conventional or natural oyster shell. This material is porous and honeycombed and is of a very corrosion resisting nature. It is relatively heavy and has a color that is somewhat like that of some oyster shells. The pieces 10 are dried by vacuum process and then taken individually and soaked in a liquor derived from oysters, and allowed to dry. This is termed the basic treatment. Then the pieces are impregnated with a solution of DDT, or other suitable poison not effected too much by salt water and allowed to dry again. The poisons deemed desirable in this instance are thiocyanobenzoic acid, diisopropyl florophosphate and dichloro-diphenyl-trichloroethane used in quantities of strength sufficient to kill the starfish and borers. Then the pieces of treated slag are dried and vacuum treated to remove all excess air from among the pores and more oyster liquor is allowed to soak in, and stay there. These pieces are then taken to the oyster beds and dropped on to them and left there.

When a starfish swims or moves by the bed where these pieces are, he is attracted by the infusion of oyster juice or liquor, and proceeds to settle himself on one of them with the intention of eating the oyster. His tentacles embrace the piece of slag 10 and he proceeds to suck up the liquor, from the pores which is now impregnated with the poison, and is soon overcome and killed by it. An oyster borer is a snail-like creature that places his proboscis on the pieces of slag, when he tries to bore through the slag piece, he absorbs the poison and is killed off by it.

The method described above is that preferred, but it has been proven practical to eliminate the first soaking of the pieces of slag in the oyster liquor, and instead apply the poison first, following the process with the oyster liquor. Oyster liquor referred to herein is the juice found in an oyster shell when shucked and it and the oyster are both collected in the same oyster bucket. The slag is very retentive of the materials used, even if the pieces are dropped in sea water, that is frequently changing by reason of tides or currents. The materials enter so deeply into the pores of the slag that they are not affected thereby, except that they become dissolved in the crevices and make a saturated solution that stays there until it is sucked out by the parasite. Eventually the slag becomes covered by sand and growth, and rendered unavailable to the parasites, but this takes several years. It is economical to replenish the beds with more treated slag to take care of the starfish and borers that follow in their quest for victims.

This method of protecting the oyster beds is relatively inexpensive, but is effective. The slag by its form serves as an attraction to the parasitic shellfish so that they bring themselves to the place and means of execution on their own initiative. They are caught like a fish by a hook, except that their destruction is engendered by a chemical implement instead of a mechanical one. This is more effective than the hit and miss methods that have been previously suggested. It is preferred that the placement of the toxic bait units be on the borders or outside of the oyster beds so they will not interfere with the cultivation of the oysters inside the bed area but will attract the echinoderms on their way to them, whether swimming in the water or crawling over the ground. The toxic bait may be placed directly on the oysters in the bed and will effectively drive off and/or dispose of the starfish and borers. The oyster (or shellfish) liquor not only attracts the parasites, but disguises the poison with a natural and attractive element.

While but one form of the invention has been outlined herein, it is not desired to limit this application for patent to this particular method and means, as it is appreciated that other arrangements could be made that would employ the same principles and come within the scope of the appended claims.

Having thus described the invention what is claimed is:

1. An eliminator for oyster parasites comprising a piece of porous slag, a toxic material distributed over said slag, whereby an oyster parasite will be able to attach itself thereto and absorb the said toxic material, when distributed around an oyster bed, and oyster liquor added to said material to attract said parasite.

2. The method of eliminating parasitic echinodermic and boring classes from oyster beds consisting in treating pieces of slag with toxic materials, adding oyster liquor to the slag for increasing attraction to the parasites and disguising the toxic materials, and distributing the pieces around the oyster beds.

3. The method of eliminating parasitic echinodermic and boring classes from oyster beds consisting in shaping pieces of slag in the form of oyster shells, treating the said pieces with toxic materials, adding oyster liquor to the slag for increasing attraction to the parasites and disguising the toxic materials, and distributing the pieces around the oyster beds.

ALLAN A. SOLLERS.

REFERENCES CITED

The following references are of record in the file of this patent:

UNITED STATES PATENTS

| Number | Name | Date |
|---|---|---|
| 944,419 | Ellis | Dec. 28, 1909 |
| 1,185,894 | Evans | June 6, 1916 |
| 1,921,945 | Robertson | Aug. 8, 1933 |
| 2,181,882 | Flower | Dec. 5, 1939 |

FOREIGN PATENTS

| Number | Country | Date |
|---|---|---|
| 379,141 | France | Oct. 25, 1907 |

OTHER REFERENCES

Fishery Circular No. 25 (Bureau of Fisheries), issued July 30, 1937, pages 20 and 24.